United States Patent
Chapman

(10) Patent No.: US 9,127,744 B2
(45) Date of Patent: Sep. 8, 2015

(54) CAMERA ISOLATOR WITH ADJUSTABLE DAMPENING

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc., North Hollywood, CA (US)

(*) Notice: Subject to any disclaimer, the term of this patent is extended or adjusted under 35 U.S.C. 154(b) by 207 days.

(21) Appl. No.: 13/915,508

(22) Filed: Jun. 11, 2013

(65) Prior Publication Data

US 2014/0008851 A1 Jan. 9, 2014

Related U.S. Application Data

(63) Continuation-in-part of application No. 13/855,485, filed on Apr. 2, 2013, now abandoned, which is a continuation-in-part of application No. 13/542,339, filed on Jul. 5, 2012, now Pat. No. 8,882,088.

(51) Int. Cl.
*F16M 1/00* (2006.01)
*F16F 13/00* (2006.01)
*F16F 15/02* (2006.01)
*F16M 11/04* (2006.01)
(Continued)

(52) U.S. Cl.
CPC ............. *F16F 13/007* (2013.01); *F16F 15/022* (2013.01); *F16M 11/043* (2013.01); *F16M 11/12* (2013.01); *F16M 11/42* (2013.01); *F16M 2200/041* (2013.01); *F16M 2200/047* (2013.01)

(58) Field of Classification Search
CPC ....... F16F 15/022; F16F 15/02; F16F 15/023; F16F 15/00; F16M 11/18; F16M 11/14; F16M 11/123; F16M 11/121; F16M 11/12
USPC .................. 267/136, 195; 248/581, 582, 583, 248/187.1; 396/728, 428
See application file for complete search history.

(56) References Cited

U.S. PATENT DOCUMENTS 3,703,999 A * 11/1972 Forys et al. .................... 248/550
4,989,823 A 2/1991 Chapman
5,062,730 A * 11/1991 Tomii et al. ...................... 403/57
(Continued)

FOREIGN PATENT DOCUMENTS

| CN | 201166242 | * 12/2008 | ............. F16M 11/16 |
| JP | 2004-340372 A | 12/2004 | |
| JP | 2009180764 A1 | 8/2009 | |

OTHER PUBLICATIONS

English-language abstract of CN 2011-66242 (2015).*
(Continued)

*Primary Examiner* — Nicholas J Lane
(74) *Attorney, Agent, or Firm* — Kenneth H. Ohriner; Perkins Coie LLP

(57) ABSTRACT

A shock and vibration isolator camera includes a top plate is attached to a bottom plate via a universal joint that allows the top plate to pivot about two mutually perpendicular axes relative to the bottom plate. A camera attachment fitting, such a Mitchell mount fitting, may be provided on the top plate, for attaching a camera or camera accessory to the top plate. Springs are compressed between the top and bottom plates. Fluid dampeners between the top and bottom plates are connected to a valve that allows dampening to be adjusted.

12 Claims, 9 Drawing Sheets

(51) Int. Cl.
*F16M 11/12* (2006.01)
*F16M 11/42* (2006.01)

(56) References Cited

U.S. PATENT DOCUMENTS

| | | | |
|---|---|---|---|
| 5,312,121 A | 5/1994 | Chapman | |
| 5,816,552 A | 10/1998 | Chapman | |
| 6,019,154 A * | 2/2000 | Ma et al. | 156/580 |
| 6,086,207 A | 7/2000 | Chapman | |
| 6,758,623 B2 | 7/2004 | Bushey | |
| 7,137,747 B2 | 11/2006 | Chapman | |
| 7,775,488 B2 | 8/2010 | McAnulty | |
| 2003/0147641 A1 * | 8/2003 | Haney | 396/419 |
| 2005/0232625 A1 * | 10/2005 | Chapman | 396/428 |
| 2006/0147195 A1 | 7/2006 | Lim et al. | |
| 2006/0239678 A1 | 10/2006 | Itzkowitz | |
| 2010/0301164 A1 | 12/2010 | Hudson | |
| 2011/0033179 A1 * | 2/2011 | Sasaki | 396/427 |

OTHER PUBLICATIONS

U.S. Patent and Trademark Office, Office Action issued in U.S. Appl. No. 13/542,339 (Jun. 5, 2014).
Korean Intellectual Property Office, International Search Report and Written Opinion for PCT/US2013/047976, Sep. 26, 2013.
Chapman/Leonard Studio Equipment, Inc. Jun. 2005 Catalog, pp. 22, 25, 38, 39, 42, 50, 57, 70, 74 and 75.
Chapman/Leonard Studio Equipment, Inc. Oct. 2008 Catalog, pp. 68-70.
Rotating Offset, Pivot (ROP), www.jlfisher.com/dollies/optional_accessories . . . (Jun. 28, 2012).

* cited by examiner

CAMERA ISOLATOR WITH ADJUSTABLE DAMPENING

This Application is a Continuation-in-Part of U.S. patent application Ser. No. 13/855,485 filed Apr. 2, 2013, now pending, which is a Continuation-in-Part of U.S. patent application Ser. No. 13/542,339 filed Jul. 5, 2012, now pending, and both of which are incorporated herein by reference.

BACKGROUND OF THE INVENTION

The invention provides to an isolator for isolating a camera from shock and/or vibration. When filming or recording images, it is often necessary for the camera to be moved over a floor or ground surface. This movement must be accomplished smoothly. Even small amounts of shock or vibration of the camera can result in images that are shaky, erratic or blurred. Consequently, it is necessary to provide a steady platform for the camera by isolating the camera from shock and vibration. It is an object of the invention to provide an improved shock and vibration isolator for use with a camera.

SUMMARY OF THE INVENTION

In a new isolator design, a top plate is attached to a bottom plate via a universal joint that allows the top plate to pivot about two mutually perpendicular axes relative to the bottom plate. A camera attachment fitting, such a Mitchell mount fitting, may be provided on the top plate, for attaching a camera or camera accessory to the top plate. A threaded fitting may be provided on the bottom plate, for attaching the isolator to a supporting structure, such as the arm of a camera crane or camera dolly, or to an intermediate accessory such as a riser, drop-down, extension, etc. Springs and dampeners are positioned between the top and bottom plates. The dampeners are adjustable to match the dampening provided with the load on the isolator. The isolator may effectively isolate the camera from horizontal axis shock and vibration.

BRIEF DESCRIPTION OF THE DRAWINGS

In the drawings the same element indicates the same element in each of the views.

DETAILED DESCRIPTION OF THE DRAWINGS

Figure 1:
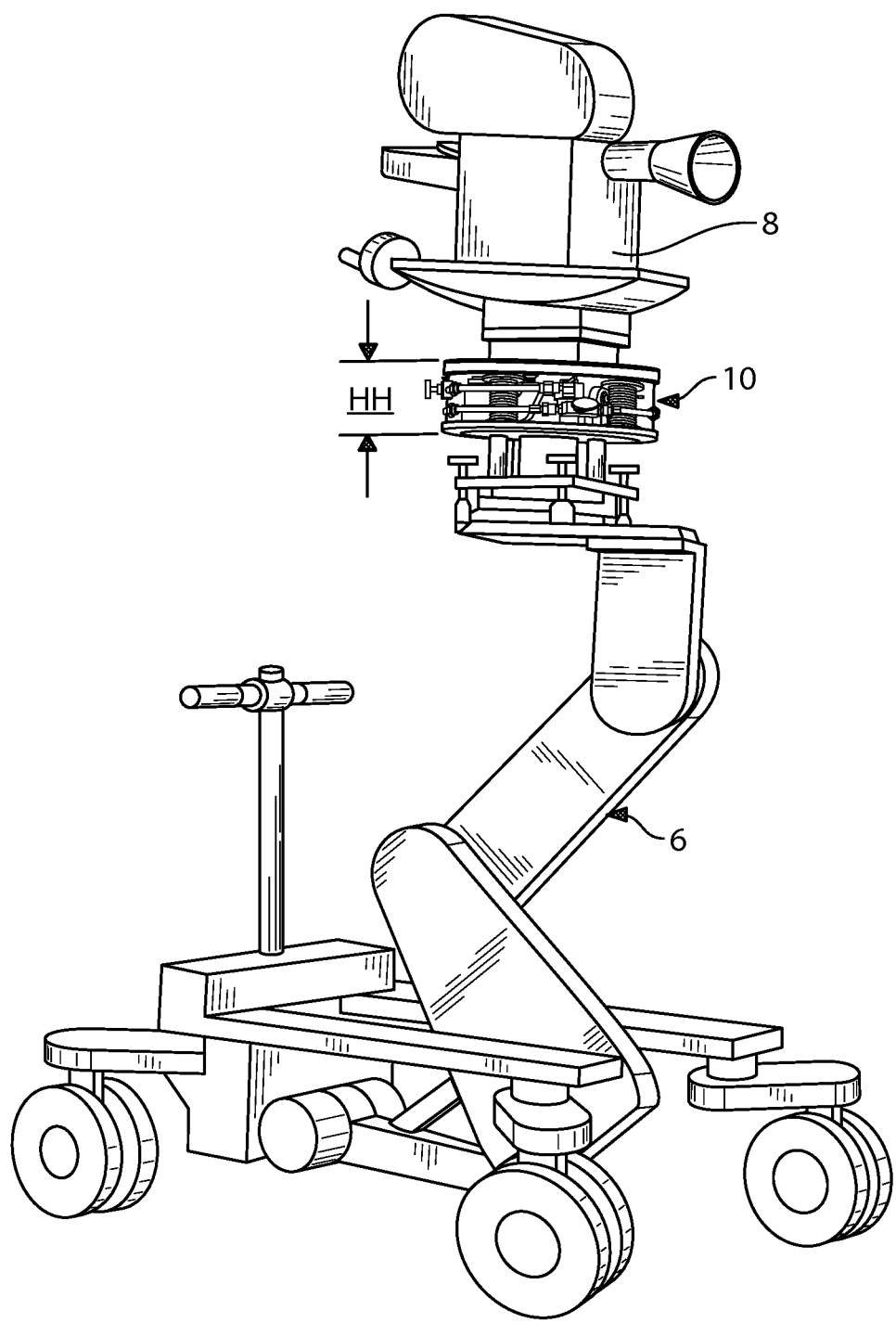
FIG. 1 is a perspective view of a shock and vibration isolator attached to the arm of a camera dolly and supporting a camera.
Figure 2:
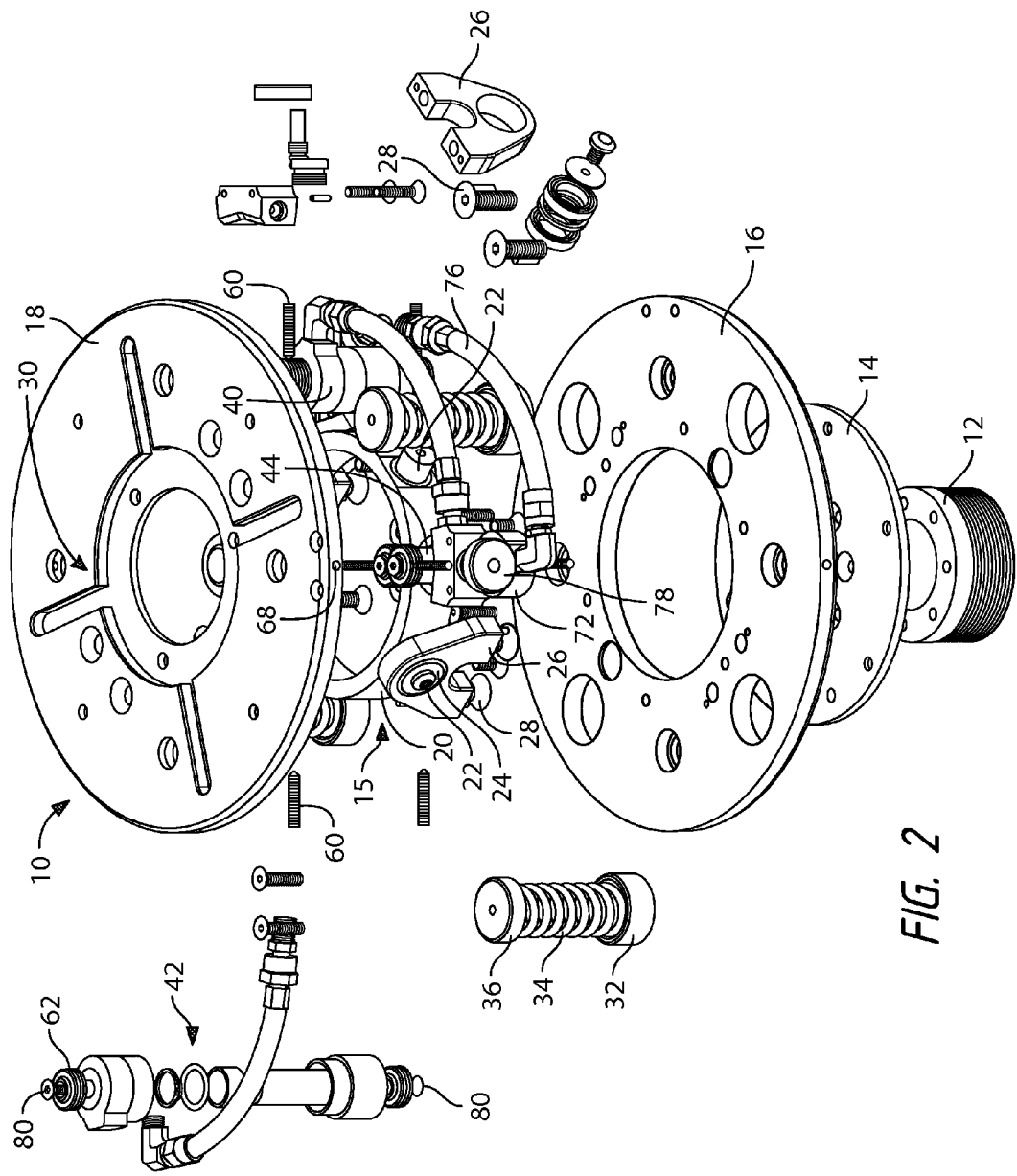
FIG. 2 is an exploded perspective view of the isolator shown in FIG. 1.

A shown in FIG. 1, an isolator 10 may be supported on a camera dolly 6 or a camera crane, to isolate a camera 8 from shock and vibration. As shown in FIG. 2, a top plate 18 is attached to a bottom plate 16 via a universal joint 15. The isolator may be attached to a camera dolly 6 or camera crane arm using a hollow threaded stud 12 attached to a stud plate 14 on the bottom plate 16.

Figure 3:
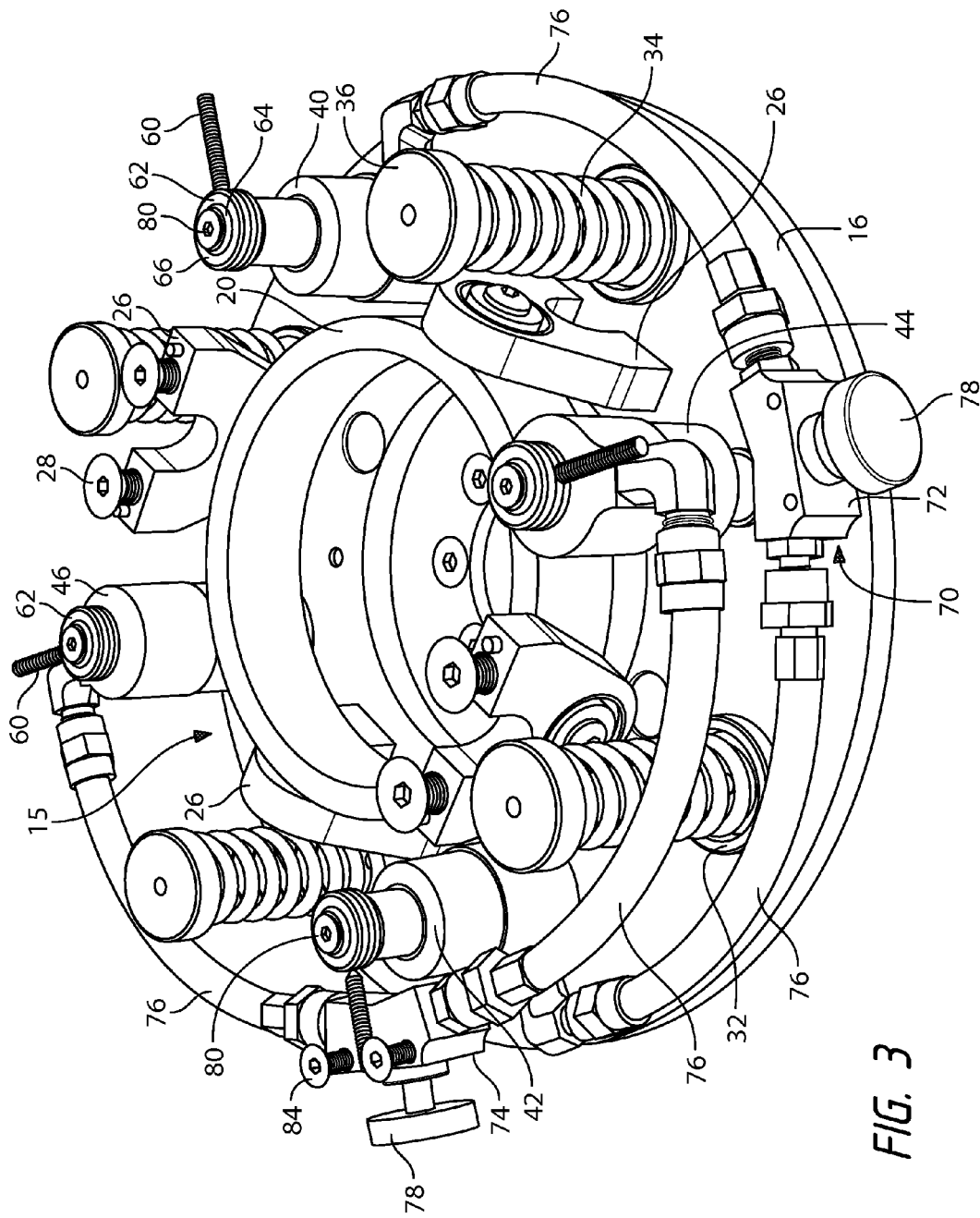
FIG. 3 is a perspective view of the isolator shown in FIGS. 1 and 2, with the top plate removed for purpose of illustration.

FIGS. 2 and 3 show an example of a universal joint 15 having an axle ring 20 with lateral and longitudinal axles 22 that are pivotally attached to lateral and longitudinal arms 26, respectively. The arms may attach to the axles through bearings 24. In the example shown, the lateral arms 26 are attached to the bottom plate 16 and the longitudinal arms 26 are attached to the top plate 18, using flathead bolts 28. Other types of universal joints may also be used.

The universal joint 26 allows the top plate 22 to pivot about lateral and longitudinal axes relative to the bottom plate 24. The limit of pivoting movement may vary depending on several factors. In the design shown, pivoting movement may be limited to about +/−15 or 12 degrees. The four axles 22 are equally spaced apart on the circumference of the ring 20. The terms lateral and longitudinal are used here for description only, as plates 16 and 18 and the universal joint 15 may be symmetrical about any centerline or diameter.

As shown in FIGS. 2 and 3, springs 34 are attached to the top plate 18 and to the bottom plate 16 and bottom plates. Four equally spaced apart springs 34 may be used, with each spring 34 having a spring foot 32 and a spring cap 36. The spring foot 32 of each spring 34 may be threaded, pressed or bolted onto the bottom plate 16, with FIG. 2 showing a design having holes for pressing the feet 32 into the bottom plate 16. The spring cap 36 of each spring 34 may held against the bottom surface of the top plate 18 via spring force, with the spring 34 compressed between the plates 16 and 18. Alternatively, flathead bolts extending through holes in the top plate 18 may thread into the spring caps 36, so that both the lower and upper ends of the springs are positively attached to the bottom and top plates, respectively. The springs are compressed or preloaded between the plates when the isolator 10 is assembled. The springs exert an outward, compressive force acting on the plates tending to hold or return the top plate to the level position shown in FIG. 2, where the top plate is parallel to the bottom plate. Although four springs are shown, designs with three springs, or five or more springs may also be used. A resilient material, such as blocks or a continuous ring of resilient material, may optionally be used in place of or in addition to use of the typically steel individual coil compression springs shown.

Also as shown in FIGS. 2 and 3, first, second, third and fourth dampeners, 40, 42, 44 and 46 are positioned between the plates 16 and 18. The first dampener 40 is paired with the second dampener 42, and the third dampener 44 paired with the fourth dampener 46, with each pair of dampeners on perpendicular diameters of the top or bottom plate. Since the dampeners are generally rigid, unlike the springs 34, and since the dimensions and angles between the plates 16 and 18 change during use of the isolator 10, the dampeners, unlike the springs, cannot be bolted or otherwise rigidly attached directly to the plates. Rather, the upper and lower ends of the dampeners may be attached to the top and bottom plates via ball swivel bearings 62, or similar devices allowing for movement in two axes.

Referring to FIG. 2, in this example flathead bolts 80 extend through holes in the plates and attach to an inner ball 64 of the swivel bearings 62, attaching the upper and lower ends of the dampeners to the top and bottom plates 16 and 18. The collar 66 surrounding the inner ball of each swivel bearing 62 may be attached to the top or bottom plate via a set screw 60 threaded into a radial hole at the outer perimeter of the plate. This allows for a compact design, with the isolator having a height HH in FIG. 1 that may be minimized down to about 7-12 or 8-15 cm.

Figure 10:
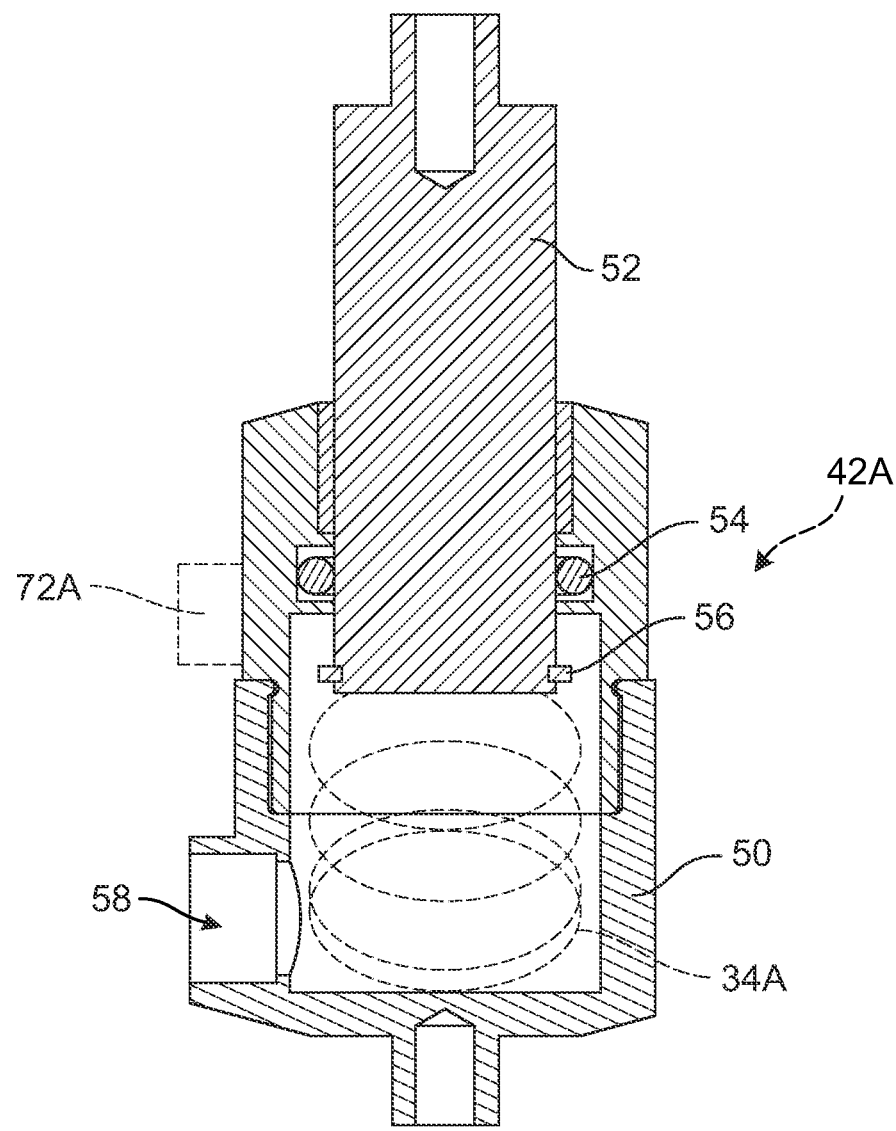
FIG. 10 is a section view of one of the dampeners shown in FIGS. 2 and 3.

FIG. 10 shows one type of dampener that may be used having a piston 52 that moves into and out of a fluid-filled cylinder 50. The piston may slide through a seal 54 that seals the fluid in. A stop ring 56 limits outward movement of the piston 52. Each of the dampeners may use this design.

As shown in FIGS. 2 and 3 a dampener adjustment system 70 may include first and second valves 72 and 74, such as needle valves, each having a control knob or lever 78. Hoses 76 connect to the ports 58 of the first dampener 40 and the third dampener 44 to the first valve 72. Similarly, hoses 76 connect the ports 58 of the second dampener 42 and the fourth dampener 46 to the second valve 74. Optionally, a single valve having four ports may be used instead of the two separate valves shown.

Figure 6:
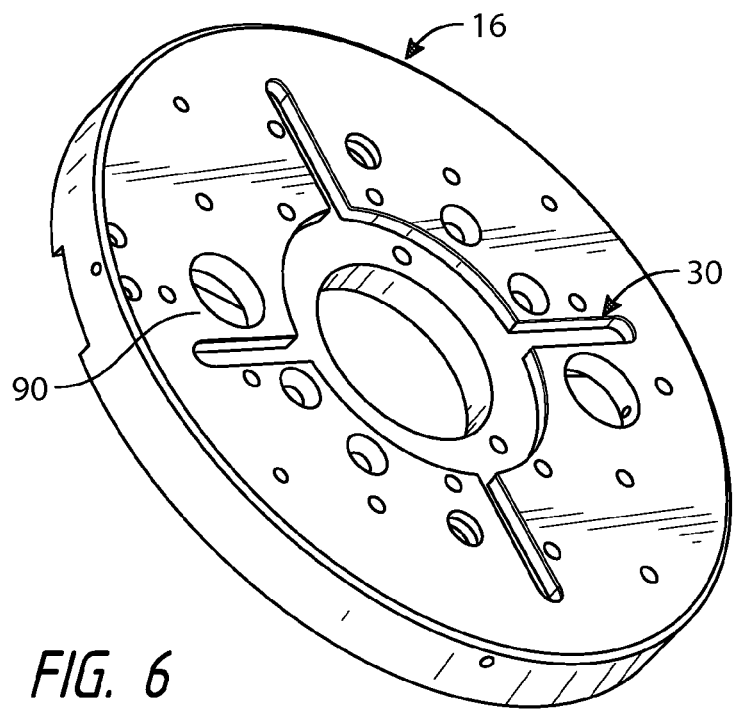
FIG. 6 is a top view of the base plate of the isolator as shown in FIG. 2.
Figure 7:
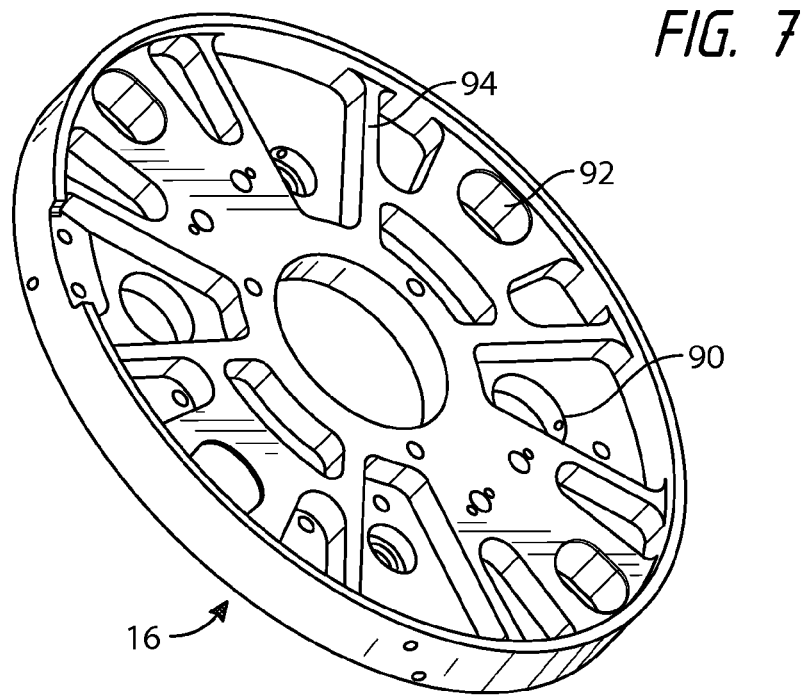
FIG. 7 is a bottom view of the base plate shown in FIG. 6.
Figure 8:
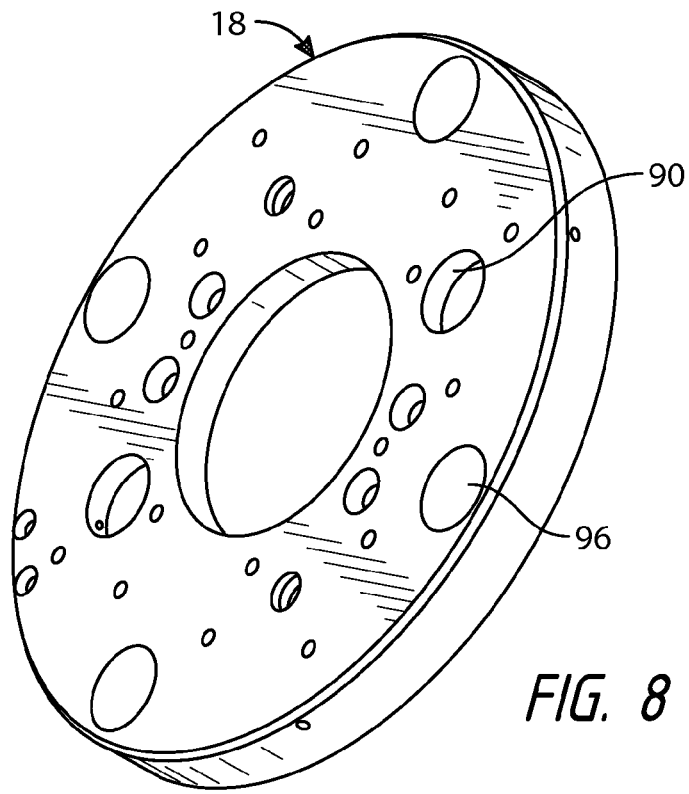
FIG. 8 is a top view of the top plate as shown in FIG. 5.
Figure 9:
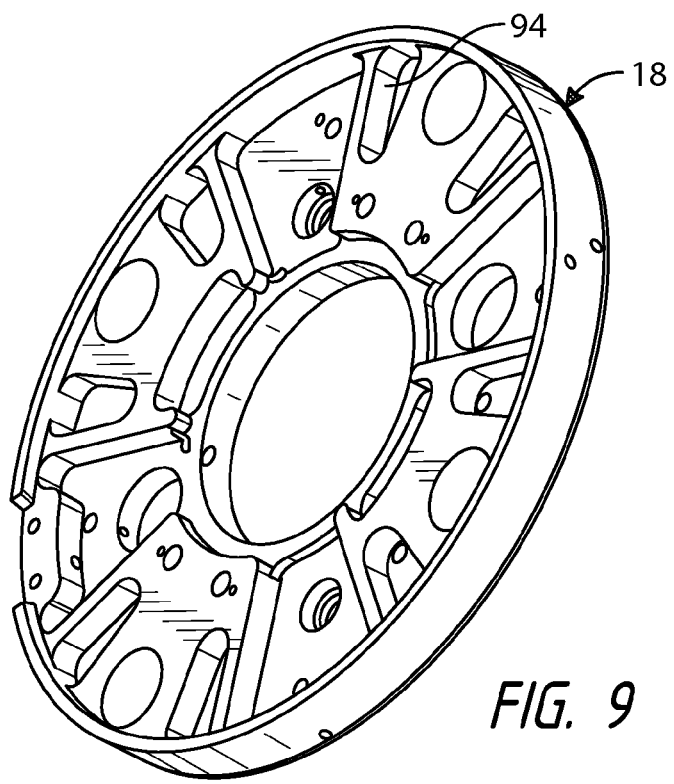
FIG. 9 is a bottom view of the top plate as shown in FIG. 8.

Referring to FIGS. 6 and 8, threaded outer collar holes 90 may be provided in the base plate 16 and the top plate 18 for attaching the outer collar 66 of the dampeners 40, 42, 44 and 46. The base plate 16 and the top plate 18 may have webs 94 or similar structural elements to reduce bending under load and to raise their resonant frequencies. The plates may also have counterbores or sockets 92 and 96 for receiving the spring caps 36 and spring feet 32

As shown in FIG. 2, a fitting or feature 30 may be provided on the top plate 18, to allow a camera or a camera accessory to be conveniently attached to the top plate. The fitting 30 may be a Mitchell mount, which is a standard fitting well known in the motion picture industry. Other types of fittings may of course optionally be used. The top and bottom plates may be round and have the same diameter, ranging from about 18 to 30 cm. The top surface of the top plate may be flat, with no projections or protrusions, to allow a camera or any accessory (such as a pan head, tilt head, riser, etc.) to be attached without interference.

Figure 4:
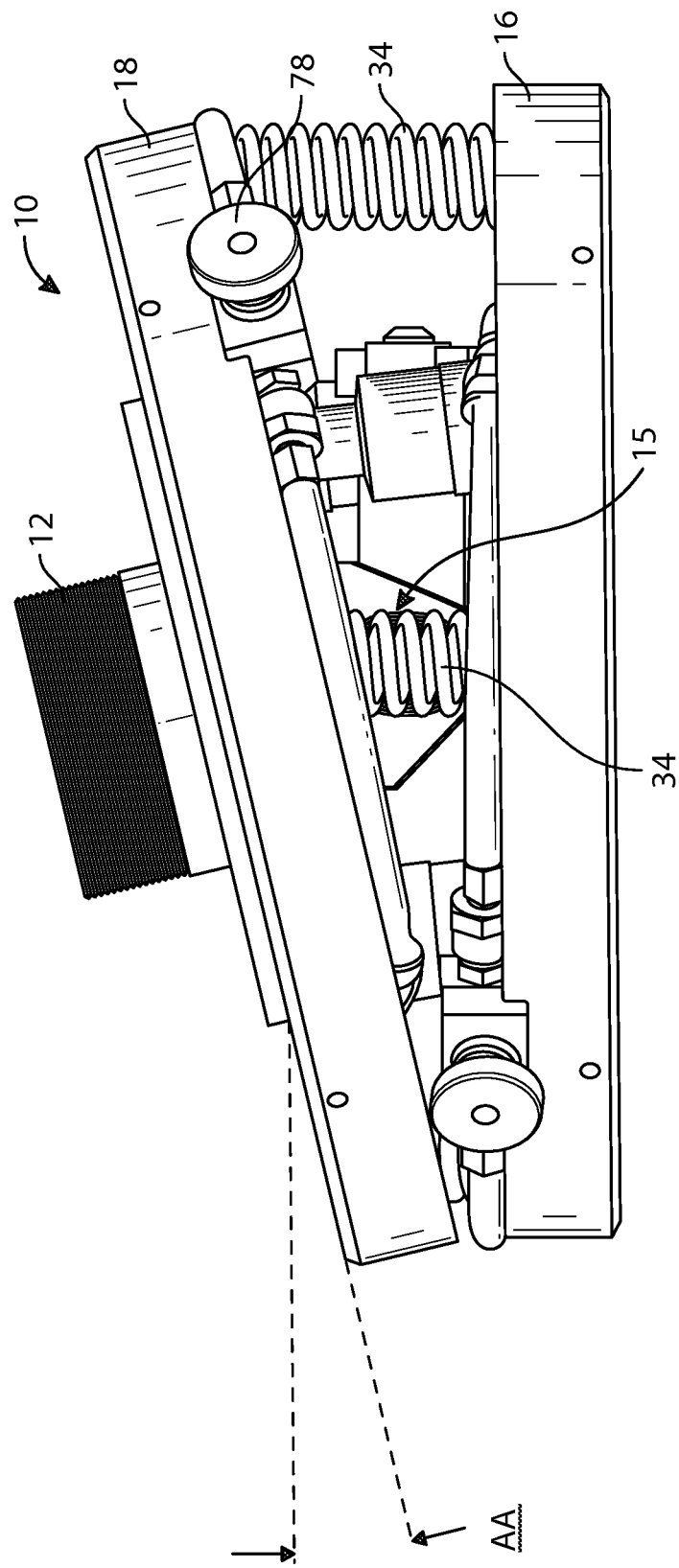
FIG. 4 is a side view of the isolator of FIG. 1 shown at a maximum tilt angle AA.
Figure 5:
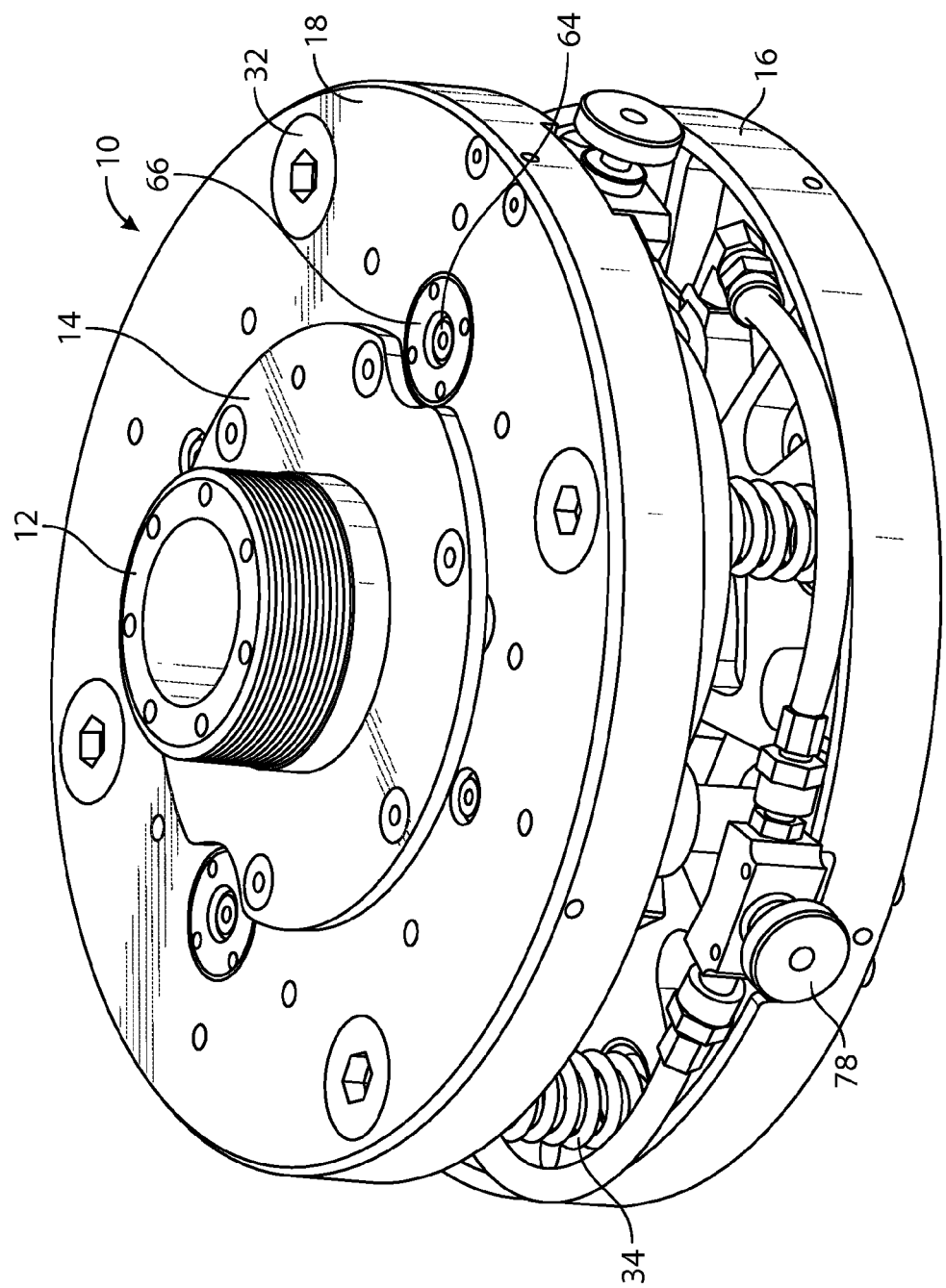
FIG. 5 is a perspective view of the isolator shown in FIG. 1.

In use, the camera (and optionally accessories) i.e., the payload, is attached onto the top plate 18. The valves 72 and 74 are adjusted by turning the knobs 78 to increase or decrease the amount of dampening provided by the isolator 10, based on the weight of the payload. By matching the amount of dampening to the payload weight, the isolator is able to better isolate the camera from shock and vibration. FIG. 4 shows the top plate 16 and base plate 18 displaced to a maximum tilt angle AA, which generally ranges from 8-16 or 10-12 degrees. The terms top plate and base or bottom plate may be used interchangeably depending on whether the isolator 10 is arranged in an underslung or overslung position, i.e., whether the structure to which the isolator 10 is attached using the stud 12 is above or below the isolator 10.

For a lightweight payload where minimal dampening is preferred, the valves 72 and 74 may be fully open. This allows fluid to more freely flow between the pairs of dampeners 40 and 44, and 42 and 46, providing relatively little dampening. For a heavy payload, the valves 72 and 74 may be partially closed. This restricts flow of fluid between the pairs of dampeners which increases dampening. The valves may also be fully closed during set up, so that the top plate is virtually rigidly fixed in position relative to the bottom plate, and relative to the dolly or other support.

With the valves 72 and 74 providing a desired amount of dampening, when the top plate 18 is displaced from level due a shock or vibration impulse, the springs 34 act to quickly return it to level. The dampeners dampen the initial displacement and also the return movement, and help to reduce or avoid overshooting or resonance.

Referring to the elements shown in dotted lines in FIG. 10, it is also possible to provide a separate valve 72A on each individual dampener. In this alternative design no fluid lines between dampeners are needed. Rather, a valve on each dampener may be provided, for example with a visual number scale. The dampening of each dampener may then be individually set, with the dampeners typically adjusted to the same numerical setting. Although this design requires adjusting four separate dampening elements, as opposed to only two with the design shown in FIGS. 1-13, it may require fewer components. In addition, combined spring/adjustable dampener components 42A may be used, typically with four of them equally spaced apart at 90 degree intervals, for example by combining a spring 34A into a dampener 40 as shown in dotted lines in FIG. 4.

Figure 13:
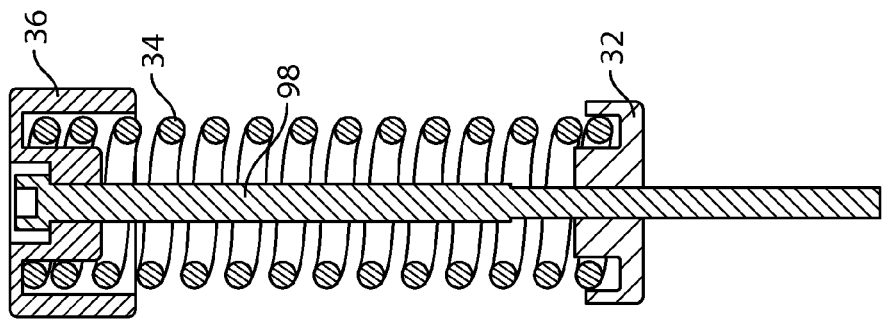
FIGS. 12 and 13 are side and section views of the spring assembly during assembly into the isolator shown in FIGS. 1-5.
Figure 12:
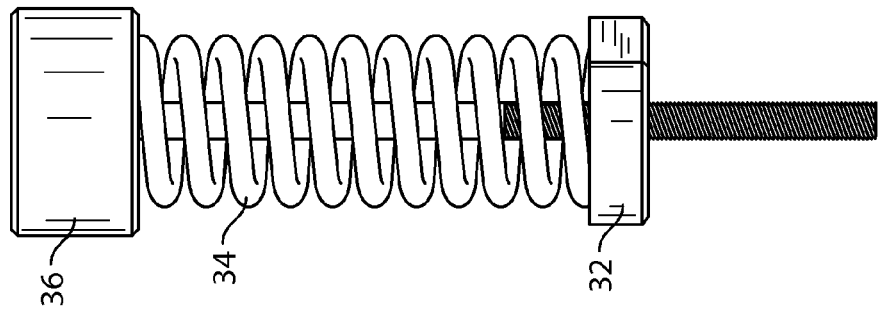
Figure 11:
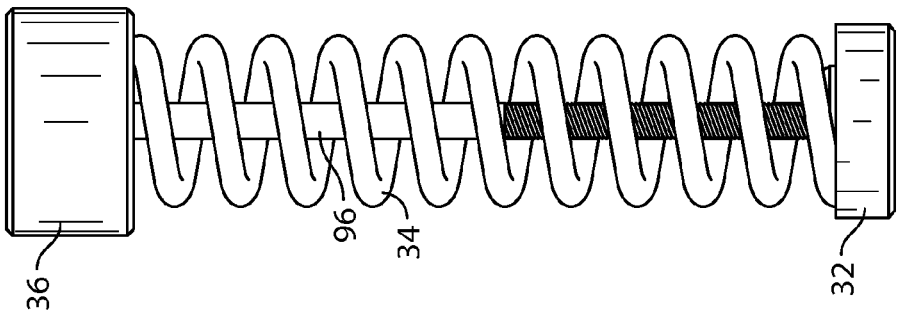
FIG. 11 is a side view of a spring assembly before assembly into the isolator as shown in FIG. 2.

As shown in FIGS. 11-13, each spring 34 may be initially compressed for installation between the plates 16 and 18 by a spring screw 98 extending through the spring cap 36 and threaded into the spring foot 32. This allows the spring 34 to be easily compressed from an unloaded condition shown in FIG. 11, to a compressed condition shown in FIGS. 12 and 13. The spring screw 98 holds the spring in compression while the spring assembly is installed between the plates. The spring screw 98 is then removed leaving the spring in compression between the plates.

Thus, a novel isolator has been shown and described. Various changes and substitutions may of course be made, without departing from the spirit and scope of the invention. The invention, therefore, should not be limited, except by the following claims, and their equivalents.

The invention claimed is:

1. An isolator, comprising:
    a top plate attached to a bottom plate via a universal joint that allows the top plate to pivot about two mutually perpendicular axes relative to the bottom plate;
    a camera attachment fitting on the top plate;
    first and second fluid dampeners spaced apart from each and attached to the top and bottom plates, with the first and second fluid dampeners connected via first and second fluid lines to a first valve, wherein the first valve is configured to adjust an amount of flow between the first fluid dampener and the second fluid dampener to adjust an amount of damping and
    first and second spaced apart springs between the top and bottom plates.

2. The isolator of claim 1 having third and fourth dampeners, with the first, second, third and fourth dampeners equally spaced apart, and with the third and fourth dampeners connected via third and fourth fluid lines to a second valve.

3. The isolator of claim 1 further including third and fourth spaced apart springs, with each spring having a spring foot attached to the bottom plate.

4. The isolator of claim 1 with the universal joint including an axle ring having a pair of lateral axles aligned perpendicularly to a pair of longitudinal axles, and with the lateral axles pivotally attached to a pair of lateral arms on the top plate, and with the longitudinal axles pivotally attached to a pair of longitudinal arms on the bottom plate.

5. The isolator of claim 2 with a ball swivel on an upper end of each dampener, with the ball swivel fitting on each dampener having an inner ball pivotally supported within a collar, and with a fastener extending through a hole in the top plate and into the inner ball, and a set screw in the top plate securing the collar to the top plate.

6. The isolator of claim 2 with each dampener having a piston movable in a cylinder, and a single fluid port in the cylinder.

7. The isolator of claim 2 with the first valve attached to the top plate and the second valve attached to the bottom plate.

8. The isolator of claim 2 with the first valve adjacent to the third dampener and the second valve adjacent to the second dampener.

9. The isolator of claim 2 with the springs aligned on a first diameter and the dampeners aligned on a second diameter larger than the first diameter.

10. An isolator comprising:
- a top plate;
- a bottom plate;
- a pair of lateral axis arms attached to the top plate;
- a pair of longitudinal axis arms attached to the bottom plate;
- an axle ring having lateral axles pivotally attached to the lateral axis arms, and longitudinal axles pivotally attached to the longitudinal axis arms, to allow the top plate to pivot up to +/−15 degrees about lateral and longitudinal axes relative to the bottom plate;
- four or more spring elements compressed between the top and bottom plates;
- first and second fluid dampeners spaced apart from each and attached to the top and bottom plates, with the first and second fluid dampeners connected via first and second fluid lines to a first valve, wherein the first valve is configured to adjust an amount of flow between the first fluid dampener and the second fluid dampener to adjust an amount of damping;
- third and fourth dampeners spaced apart from each other and attached to the top and bottom plates, with the third and fourth dampeners connected via third and fourth fluid lines to a second valve;
- a camera attachment fitting on the top plate; and
- an isolator attachment fitting on the bottom plate.

11. The isolator of claim 1 with the first spring and the first fluid dampener combined into a single first spring/adjustable dampener unit, and with the second spring and the second fluid dampener combined into a second spring/adjustable dampener unit.

12. The isolator of claim 11 further including third and fourth fluid dampeners spaced apart from each and attached to the top and bottom plates, and a third spring and a fourth spring between the upper and lower plates, with the third spring and the third fluid dampener combined into a single third spring/adjustable dampener unit, and with the fourth spring and the fourth fluid dampener combined into a fourth spring/adjustable dampener unit.

\* \* \* \* \*